(12) United States Patent
Won et al.

(10) Patent No.: US 10,777,830 B2
(45) Date of Patent: Sep. 15, 2020

(54) APPARATUS AND METHOD FOR DIAGNOSING FUEL CELL AND VEHICLE SYSTEM

(71) Applicants: HYUNDAI MOTOR COMPANY, Seoul (KR); KIA MOTORS CORPORATION, Seoul (KR)

(72) Inventors: Sang Bok Won, Seoul (KR); Young Pin Jin, Yongin-si (KR); Kwi Seong Jeong, Yongin-si (KR); Gi Young Nam, Suwon-si (KR)

(73) Assignees: HYUNDAI MOTOR COMPANY, Seoul (KR); KIA MOTORS CORPORATION, Seoul (KR)

( * ) Notice: Subject to any disclaimer, the term of this patent is extended or adjusted under 35 U.S.C. 154(b) by 242 days.

(21) Appl. No.: 15/815,028

(22) Filed: Nov. 16, 2017

(65) Prior Publication Data
US 2018/0287174 A1 Oct. 4, 2018

(30) Foreign Application Priority Data
Apr. 3, 2017 (KR) .................... 10-2017-0043227

(51) Int. Cl.
*H01M 8/04664* (2016.01)
*H01M 8/04537* (2016.01)
*H01M 8/04992* (2016.01)
*B60L 58/30* (2019.01)
*B60L 3/00* (2019.01)
*B60W 10/28* (2006.01)

(52) U.S. Cl.
CPC ....... *H01M 8/04679* (2013.01); *B60L 3/0053* (2013.01); *B60L 58/30* (2019.02); *B60W 10/28* (2013.01); *H01M 8/04559* (2013.01); *H01M 8/04589* (2013.01); *H01M 8/04992* (2013.01); *H01M 2250/20* (2013.01); *Y02T 90/40* (2013.01)

(58) Field of Classification Search
None
See application file for complete search history.

(56) References Cited

U.S. PATENT DOCUMENTS 7,531,253 B2    5/2009  Ramschak

*Primary Examiner* — Sarah A. Slifka
(74) *Attorney, Agent, or Firm* — Morgan, Lewis & Bockius LLP

(57) ABSTRACT

An apparatus for diagnosing a fuel cell and a vehicle system includes a measuring device that measures a stack voltage and a stack current from a fuel cell stack, and at least one processor that extracts a plurality of reference current points and a plurality of reference voltage points corresponding to the reference current points by analyzing the measured stack voltage and the measured stack current, calculates an abnormality degree of the fuel cell stack based on a reference signal waveform formed by using voltage differences between the reference voltage points, and determines an abnormal state of the fuel cell stack based on the calculated abnormality degree of the fuel cell stack.

18 Claims, 13 Drawing Sheets

APPARATUS AND METHOD FOR DIAGNOSING FUEL CELL AND VEHICLE SYSTEM

CROSS-REFERENCE TO RELATED APPLICATION

This application is based on and claims the benefit of priority to Korean Patent Application No. 10-2017-0043227, filed on Apr. 3, 2017, with the Korean Intellectual Property Office, the entire disclosure of which is incorporated herein by reference.

TECHNICAL FIELD

The present disclosure relates to an apparatus and a method for diagnosing a fuel cell and a vehicle system.

BACKGROUND

A fuel cell is a kind of a generator which converts chemical energy of fuel into electrical energy through electrochemical reaction in a fuel cell stack (hereinafter, "a stack") and does not convert the chemical energy into heat through combustion.

To obtain required potential in a vehicle, the fuel cell is implemented in a stack structure as unit cells are stacked by a quantity needed to have the required potential. In such the vehicle having a fuel cell, stack performance, an operating state, and a failure state are detected by using voltages of the unit cells.

According to a cell voltage measuring manner, only a stack voltage is measured to analyze the variation of the stack voltage according to the variation of a current in terms of a frequency and to drop a cell voltage of the stack, thereby diagnosing the fuel cell stack.

When the stack is diagnosed, a load is connected to the stack. While the stack is being operated, a frequency response diagnosis current having the sinusoidal waveform (B $\sin(\omega t)$) is additionally applied to the stack to diagnose the stack. In this case, the current of the stack becomes the sum of a basic operating current and a sinusoidal current. However, since the manner of additionally applying diagnosis current to the stack employs one small AC current variation as an input, lower decomposition performance is represented.

SUMMARY

The present disclosure has been made to solve the above-mentioned problems occurring in the prior art while advantages achieved by the prior art are maintained intact.

An aspect of the present disclosure provides an apparatus and a method for diagnosing a fuel cell and a vehicle system, capable of detecting an abnormal state of a fuel cell stack by using an output voltage having a reference signal waveform formed based on a stack voltage and a stack current of the fuel cell stack even if an additional alternating current (AC) signal is not applied to the fuel cell stack, and capable of detecting the abnormal state of the fuel cell stack with higher accuracy even if the unit of detecting unit of the fuel cell stack is increased.

The technical problems to be solved by the present inventive concept are not limited to the aforementioned problems, and any other technical problems not mentioned herein will be clearly understood from the following description by those skilled in the art to which the present disclosure pertains.

According to an aspect of the present disclosure, an apparatus for diagnosing a fuel cell includes a measuring device that measures a stack voltage and a stack current from a fuel cell stack, and at least one processor that extracts a plurality of reference current points and a plurality of reference voltage points corresponding to the reference current points by analyzing the measured stack voltage and the measured stack current, calculates an abnormality degree of the fuel cell stack based on a reference signal waveform formed by using voltage differences between the reference voltage points, and determines an abnormal state of the fuel cell stack based on the calculated abnormality degree of the fuel cell stack.

The at least one processor extracts at least three reference current points by analyzing a histogram of the stack current.

The at least one processor extracts two current points, which make a current value difference of at least a reference value therebetween, among current points having a frequency of occurrence equal to or greater than a reference number, according to a histogram analysis result of the stack current, and extracts, as reference current points, one or more current points having an intermediate current value between values of the extracted two current points.

The at least one processor calculates at least three reference voltage points corresponding to the at least three reference current points, which are extracted, by analyzing the stack voltage and the stack current.

The reference signal waveform is a sinusoidal waveform having amplitudes which are formed by using voltage differences among the at least three reference voltage points.

The at least one processor calculates the abnormality degree of the fuel cell stack based on a ratio of a sum of harmonic amplitudes included in an output signal based on the reference signal waveform to an amplitude of an input signal.

The at least one processor determines the fuel cell stack to be in an abnormal state if the abnormality degree of the fuel cell stack is equal to or more than a set ratio.

The at least one processor determines the fuel cell stack to be in an abnormal state if the abnormality degree of the fuel cell stack is increased by at least a set ratio from an abnormality degree of the fuel cell stack in a normal state.

The at least one processor filters the stack voltage and the stack current, which are measured, based on a reference value.

According to another aspect of the present disclosure, a method for diagnosing a fuel cell includes steps of measuring a stack voltage and a stack current from a fuel cell stack, extracting a plurality of reference current points and a plurality of reference voltage points corresponding to the reference current points by analyzing the measured stack voltage and the measured stack current, forming a reference signal waveform by using voltage differences among the reference voltage points, calculating an abnormality degree of the fuel cell stack based on the reference signal waveform, and determining an abnormal state of the fuel cell stack based on the abnormality degree of the fuel cell stack.

According to another aspect of the present disclosure, a vehicle system includes a fuel cell stack, a diagnosis device implemented by at least one processor that extracts a plurality of reference current points and a plurality of reference voltage points corresponding to the reference current points by analyzing a stack voltage and a stack current measured from the fuel cell stack, calculates an abnormality degree of the fuel cell stack based on a reference signal waveform formed by using voltage differences between the reference voltage points, and determines an abnormal state of the fuel cell stack based on the abnormality degree of the fuel cell stack, and the vehicle system further includes an input/output interface, communicatively connected through the at least one processor, that outputs the abnormal state of the fuel cell stack.

BRIEF DESCRIPTION OF THE DRAWINGS

The above and other objects, features and advantages of the present disclosure will be more apparent from the following detailed description taken in conjunction with the accompanying drawings.

DETAILED DESCRIPTION

Figure 1:
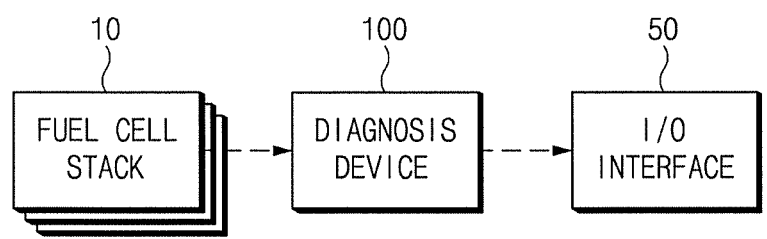
FIG. 1 is a block diagram illustrating a vehicle system employing an apparatus according to an embodiment of the present disclosure.

Hereinafter, embodiments of the present disclosure will be described in detail with reference to the accompanying drawings. In the drawings, the same reference numerals will be used throughout to designate the same or equivalent elements. In addition, in the following description, a detailed description of well-known features or functions may not be provided in order not to unnecessarily obscure the gist of the present disclosure.

In the following description of elements according to an embodiment of the present disclosure, the terms 'first', 'second', 'A', 'B', '(a)', and '(b)' may be used. The terms are used only to distinguish relevant elements from other elements, and the nature, the order, or the sequence of the relevant elements is not limited to the terms. In addition, unless otherwise defined, all terms used herein, including technical or scientific terms, have the same meanings as those generally understood by those skilled in the art to which the present disclosure pertains. Such terms as those defined in a generally used dictionary are to be interpreted as having meanings equal to the contextual meanings in the relevant field of art, and are not to be interpreted as having ideal or excessively formal meanings unless clearly defined as having such in the present application.

FIG. 1 is a block diagram illustrating a vehicle system employing an apparatus according to an embodiment of the present disclosure.

Referring to FIG. 1, the vehicle system according to the present disclosure may include a fuel cell stack 10, an I/O interface 50, and an apparatus 100 for diagnosing a fuel cell (diagnosis device 100).

The fuel cell stack 10 provides power for driving a vehicle. In this case, the fuel cell stack 10 may be configured by repeatedly stacking a plurality of unit cells.

The diagnosis device 100 may measure a stack voltage and a stack current of the fuel cell stack 10 and may form a reference signal waveform based on the stack voltage and the stack current which are measured. In this case, the diagnosis device 100 may calculate the abnormality degree of the fuel cell stack 10 by using information on harmonic components included in an output voltage of the reference signal waveform, and may diagnose the abnormal state of the fuel cell stack 10 based on the calculated abnormality degree.

In this case, the diagnosis device 100 may be implemented inside the vehicle. In this case, the diagnosis device 100 may be implemented integrally with internal control units of the vehicle. Alternatively, the diagnosis device 100 may be implemented separately from the internal control units of the vehicle and may be connected with the internal control units of the vehicle through an additional connection unit.

The details of the diagnosis device 100 will be described later by making reference to an embodiment illustrated in FIG. 2.

The I/O interface 50 may include an input unit for receiving a control command from a user and an output unit for outputting a diagnosis result of the diagnosis device 100.

In this case, the input unit may include a key button, and may include a mouse, a joystick, a jog shuttle, a stylus pen, or the like. In addition, the input unit may include a soft key implemented on a display.

The output unit may include a display and may include a voice output unit such as a speaker. In the case that a touch sensor product, such as a touch film, a touch sheet, a touch pad, or the like, is included in the display, the display may operate as a touch screen, and the input unit and the output unit may be implemented in the integral form.

In this case, the display may include at least one of a liquid crystal display (LCD), a thin film transistor-liquid crystal display (TFT LCD), an organic light-emitting diode (OLED), a flexible display, a field emission display (FED), and a three dimensional display (3D display).

Figure 2:
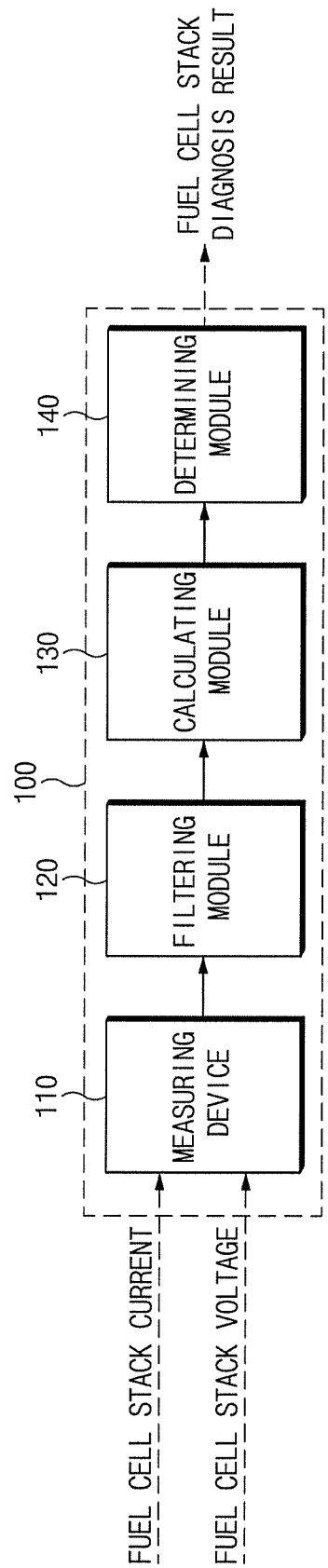
FIG. 2 is a block diagram illustrating the configuration of the apparatus according to an embodiment of the present disclosure.

FIG. 2 is a block diagram illustrating the configuration of the apparatus according to an embodiment of the present disclosure.

Referring to FIG. 2, the diagnosis device 100 may include a measuring device 110 and at least one processor performing various functions of a filtering module 120, a calculating module 130, and a determining module 140. The modules 120, 130 and 140 described below are implemented with software instructions executed on the at least one processor.

The measuring device 110 measures the stack voltage and the stack current of the fuel cell stack 10.

The filtering module 120 filters a stack voltage and a stack current exceeding a reference value by using a band pass filter. For example, the filtering module 120 may filter the stack voltage and the stack current by using a band pass filter in the range of 5-15 Hz.

An embodiment of filtering the stack voltage and the stack current will be described later with reference to FIGS. 3A to 4B.

Figure 3A:
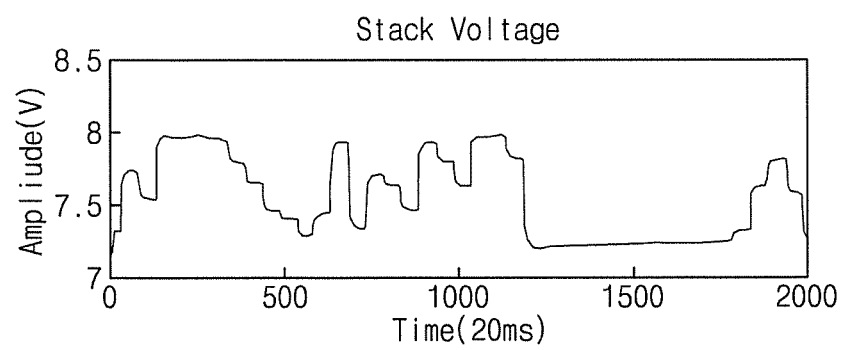
FIGS. 3A to 7B are graphs employed to describe the operations of the apparatus according to an embodiment of the present disclosure.
Figure 3B:
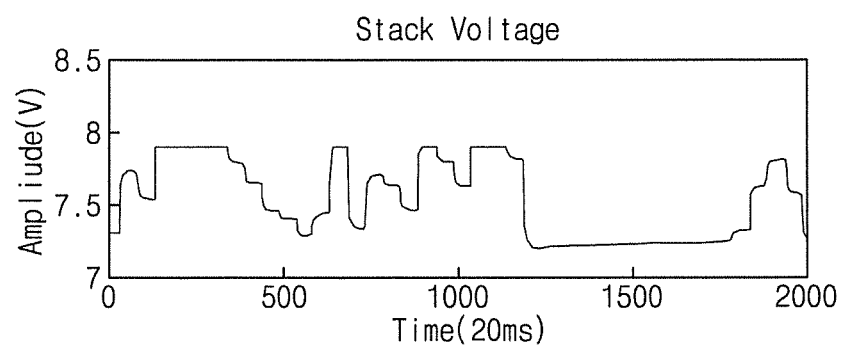
Figure 4A:
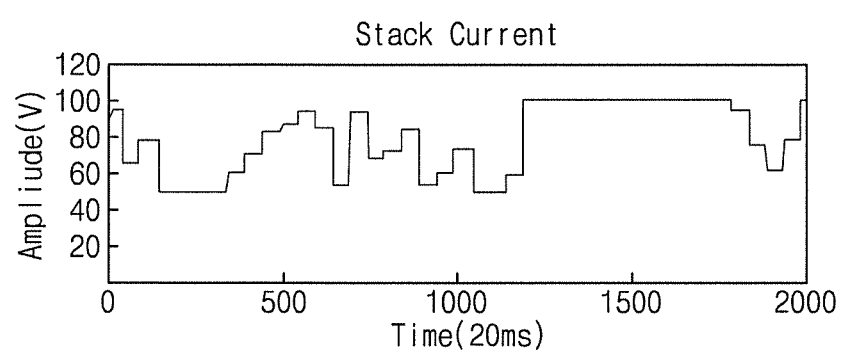
Figure 4B:
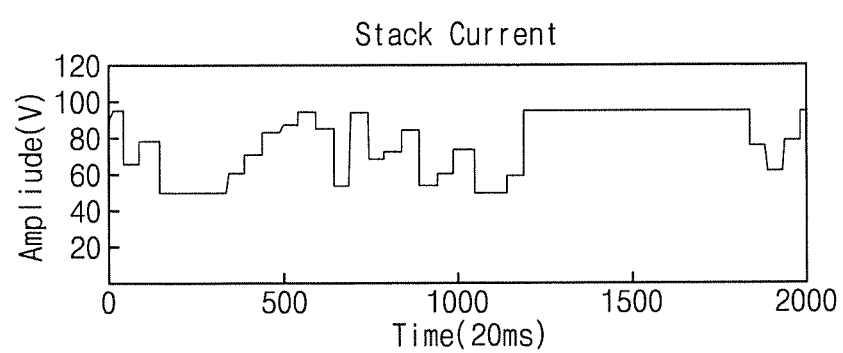

FIGS. 3A and 4A are graphs illustrating the stack voltage and the stack current of the fuel cell stack 10, which are measured by the measuring device 110. In this case, the filtering module 120 employs the band pass filter to filter the stack voltage of FIG. 3A to the stack voltage of FIG. 3B. In addition, the filtering module 120 employs the band pass filter to filter the stack current of FIG. 4A to the stack current of FIG. 4B.

The calculating module 130 analyzes the stack voltage and the stack current, which are filtered by the filtering module 120, and extracts a plurality of reference current points and a plurality of reference voltage points corresponding to the reference current points.

In this case, the calculating module 130 may extract at least three reference current points by analyzing a histogram of the stack current.

The calculating module 130 extracts two current points, which make a current value difference of at least a reference value among current points having a frequency of occurrence equal to or greater than a reference number, according to a histogram analysis result of the stack current. Then, the calculating module 130 extracts one or more current points, which have an intermediate current value between the two current points. In this case, the calculating module 130 determines the extracted current points as reference current points.

Figure 5A:
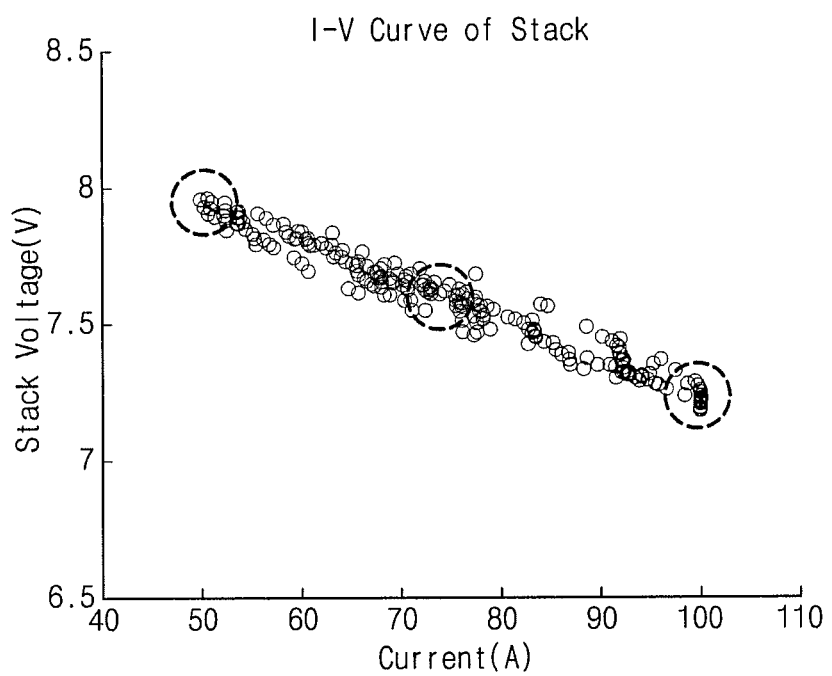

The histogram of the stack current may be represented as illustrated in FIG. 5A. Referring to FIG. 5A, the frequency of current occurrence is more highly represented at 50 A and 100 A.

The calculating module 130 extracts two current points (e.g., current points of 50 A and 100 A), which make a current value difference of at least a reference value (e.g., 50 A) among current points having the frequency of occurrence equal to or greater than a reference number (e.g., 50), according to the histogram analysis result of the stack current illustrated in FIG. 5A. Then, the calculating module 130 extracts current points, which have an intermediate current value (e.g., 75 A) between the two current points. The calculating module 130 may determine current points of 50 A, 75 A, and 100 A as reference current points.

In this case, the calculating module 130 may analyze the stack voltage and the stack current to calculate at least three reference voltage points corresponding to at least three reference current points which are extracted.

Although description has been made in that at least three reference current points and at least three reference voltage points are extracted, three reference current points and three reference voltage points will be described according to the present disclosure for the illustrative purpose.

Figure 5B:
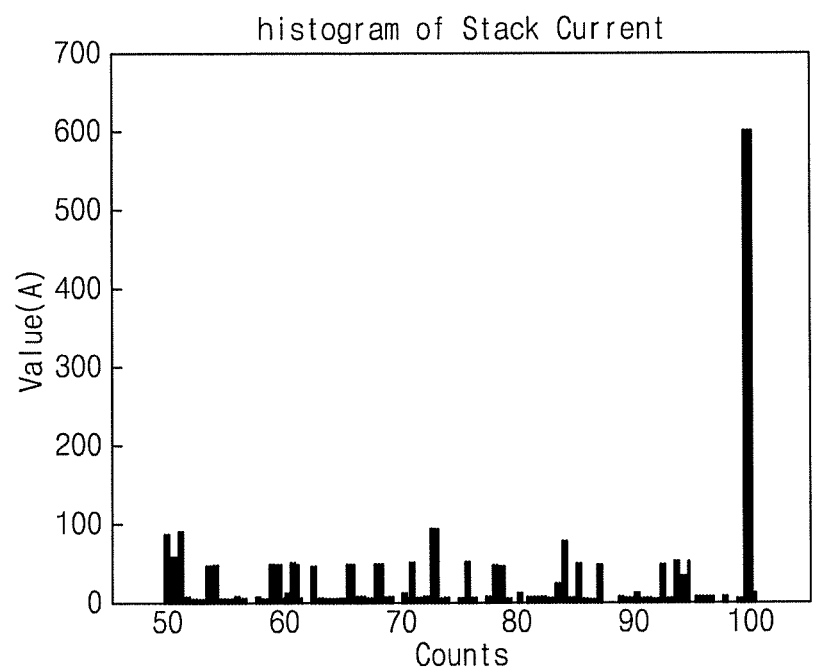

The graph representing the relationship between the stack current and the stack voltage is illustrated in FIG. 5B.

Accordingly, the calculating module 130 may calculate three stack voltage values corresponding to the current points of 50 A, 75 A, and 100 A through the graph representing the relationship as illustrated in FIG. 5B and may employ the three stack voltage values as the reference voltage points.

In this case, three stack voltage values may be an average values, the most frequency values, or an intermediate values of voltage values corresponding to the current values.

The calculating module 130 may form the reference signal waveform by using the voltage differences between the reference voltage points. In this case, the calculating module 130 may form, as the reference signal waveform, a sinusoidal waveform which has amplitudes which is formed by using voltage differences among the at least three reference voltage points The embodiment of the reference signal waveform will be described later with reference to FIG. 6.

Figure 6:
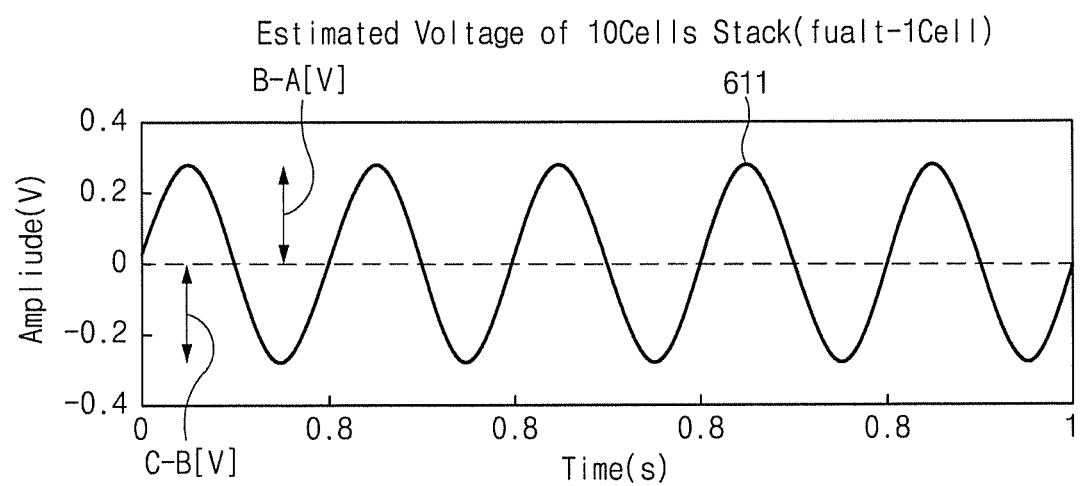

Referring to FIG. 6, on the assumption that three reference points become A, B, and C, the calculating module 130 may form a sinusoidal wave 611 having an amplitude representing the voltage difference between the reference voltage points B and A at the period between 0 and ½ and having an amplitude representing the voltage difference between the reference voltage points C and B at the period between ½ and 1. In this case, the frequency of the reference signal waveform may be arbitrarily formed.

The calculating module 130 may calculate the abnormality degree of the fuel cell stack 10 by using the reference signal waveform. In this case, the calculating module 130 calculates the abnormality degree of the fuel cell stack 10 based on a ratio of a sum of harmonic amplitudes included in an output signal based on the reference signal waveform to an amplitude of an input signal.

The abnormality degree of the fuel cell stack 10 may be calculated as expressed in Equation 1.

$$THDA = \frac{\sum \text{Amplitude of Output Signal}_{Harmonics}}{\text{Amplitude of Input Signal}} \times 100 \ [\%] \qquad \text{Equation 1}$$

The determining module 140 may determine the abnormal state of the fuel cell stack 10 based on the abnormality degree (THDA) of the fuel cell stack 10, which is calculated by the calculating module 130.

For example, the determining module 140 may determine the fuel cell stack 10 to be in the abnormal state if the abnormality degree (THDA) of the fuel cell stack 10 exceeds a set ratio. The embodiment thereof will be described below with reference to FIGS. 7A and 7B.

Figure 7A:
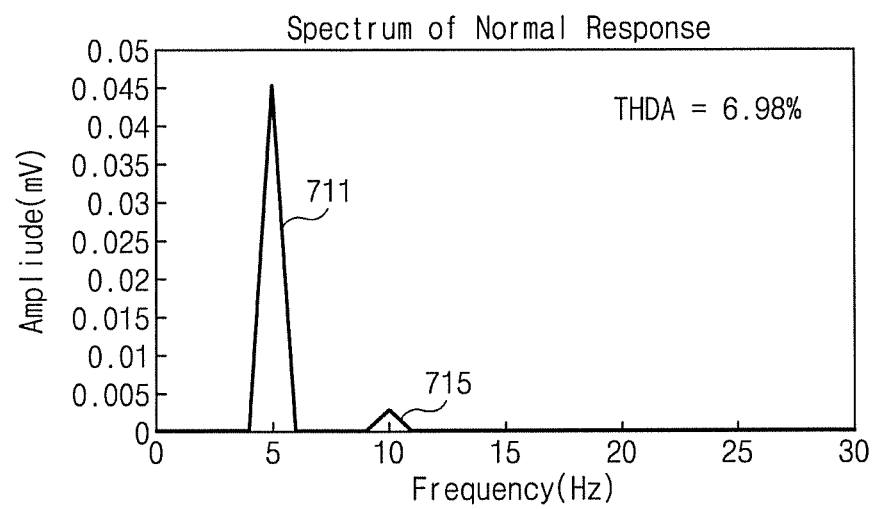

Referring to FIG. 7A, reference numeral 711 is an input signal component and reference numeral 715 is a harmonic component. The abnormality degree (THDA) of the fuel cell stack 10 calculated by using the input signal component 711 and the harmonic component 715 of FIG. 7A is 6.98%. For example, on the assumption that the set ratio is 10%, the determining module 140 may determine the fuel cell stack 10 to be in a normal state from FIG. 7A.

Figure 7B:
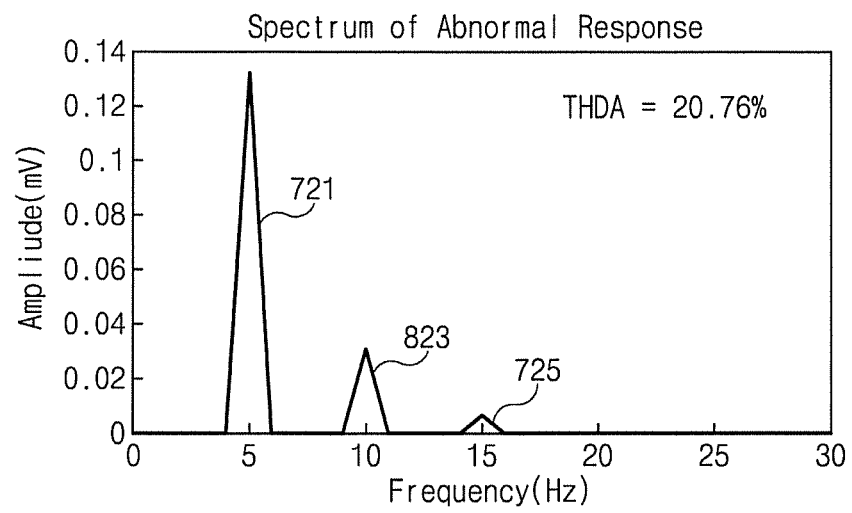

Referring to FIG. 7B, reference numeral 721 is an input signal component and reference numerals 723 and 725 are harmonic components. The abnormality degree (THDA) of the fuel cell stack 10 becomes 20.76% when being calculated by using the input signal component 721 and the harmonic components 723 and 725. For example, on the assumption that the set ratio is 10%, the determining module 140 may determine the fuel cell stack 10 to be in an abnormal state from FIG. 7B.

Alternatively, the determining module 140 may determine the fuel cell stack 10 to be in the abnormal state if the abnormality degree (THDA) of the fuel cell stack 10 is increased by at least a set ratio from an abnormality degree based on a normal state.

Meanwhile, according to an embodiment of the present disclosure, the diagnosis device 100 for the fuel cell may further a communication unit (not illustrated).

The communication unit may include a communication module which supports a communication interface with electronic parts and/or control units provided in a vehicle. In this case, the communication module may include a module which supports vehicle network communication such as a controller area network (CAN) communication, local interconnect network (LIN) communication, or Flex-Ray communication.

In addition, the communication unit may include a module for wireless Internet access or a communication module for short range communication. In this case, a wireless Internet technology may include a wireless LAN (WLAN), a Wireless Broadband (Wibro), a Wi-Fi, or a World Interoperability for Microwave Access (WiMAX). The short range communication technology may include Bluetooth, ZigBee, Ultra Wideband (UWB), Radio Frequency Identification (RFID), Infrared Data Association (IrDA) or the like.

In addition, according to an embodiment of the present disclosure, the diagnosis device 100 for the fuel cell may further include a storage unit (not illustrated) which stores data and/or an algorithm required for operating of the diagnosis device 100. In this case, the storage unit 150 may include a storage medium such as a Random Access Memory (RAM), a Static Random Access Memory (SRAM), a Read-Only Memory (ROM), a Programmable Read-Only Memory (PROM), or an Electrically Erasable Programmable Read-Only Memory (EEPROM).

Hereinafter, the operating flow of the device according to the present disclosure having the above configuration will be described below in more detail.

Figure 8:
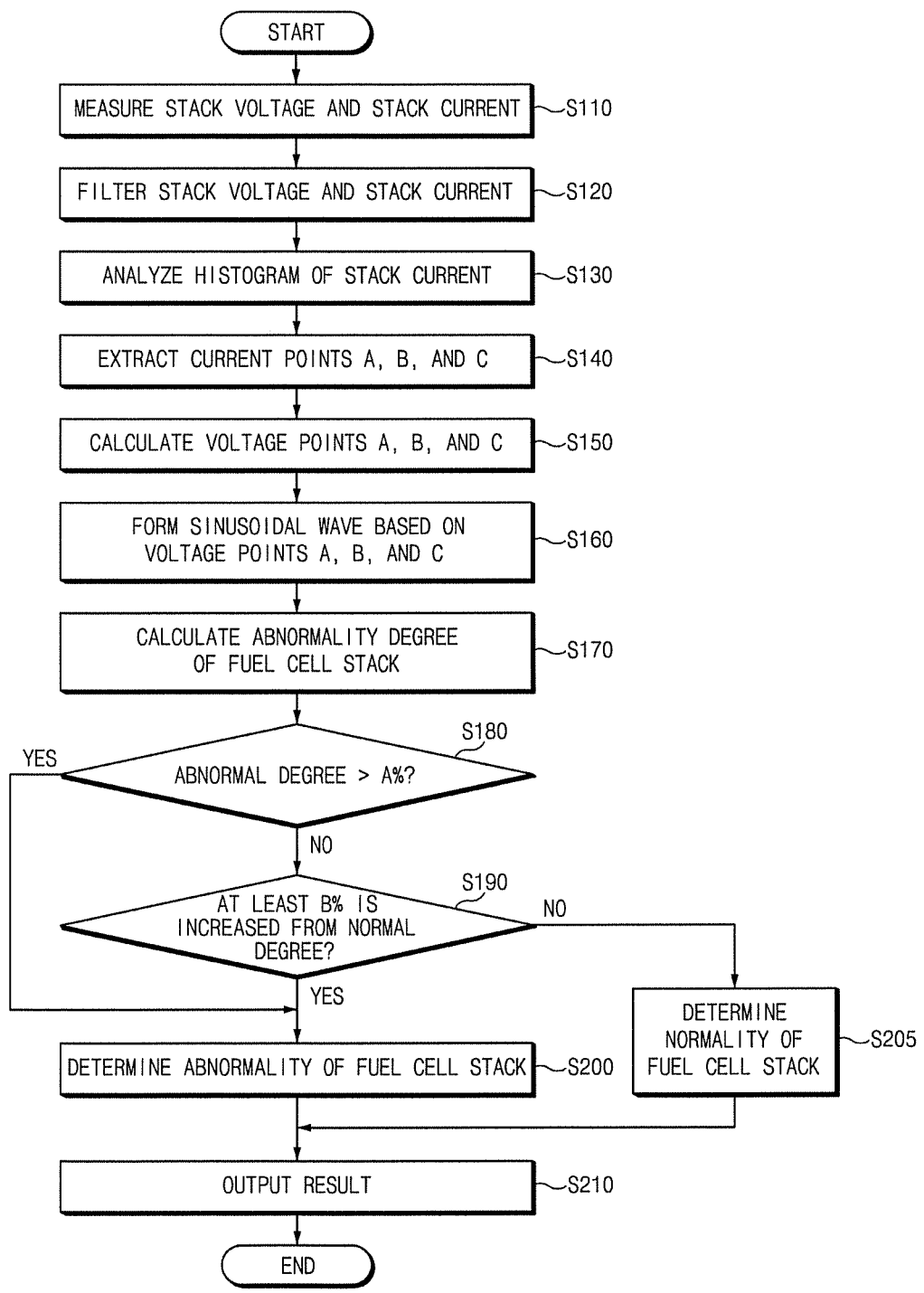
FIG. 8 is a flowchart illustrating the operations in a method according to an embodiment of the present disclosure.

FIG. 8 is a flowchart illustrating the operations in a method for diagnosing a fuel cell according to an embodiment of the present disclosure.

Referring to FIG. 8, according to an embodiment of the present disclosure, the diagnosis device 100 measures a stack voltage and a stack current of the fuel cell stack (S110) and filters a stack voltage and a stack current exceeding a reference value by using a band pass filter (S120).

The diagnosis device 100 analyzes the histogram of the filtered stack current (S130) and extracts at least three reference current points, for example, reference current points A, B, and C (S140). In addition, the diagnosis device 100 calculates voltage points corresponding to the at least three reference points extracted in operation S140 and extracts reference voltage points, for example, reference points A, B, and C (S150).

Thereafter, the diagnosis device 100 forms a sinusoidal waveform by using voltage differences among reference voltage points A, B, and C, which are extracted in operation S150, (S160). In operation S160, the diagnosis device 100 may form the sinusoidal wave 611 having an amplitude representing the voltage difference between the reference voltage points B and A at the period between 0 and ½ and having an amplitude representing the voltage difference between the reference voltage points C and B at the period between ½ and 1. In this case, the diagnosis device 100 may form, as the reference signal waveform, the sinusoidal waveform formed in operation S160.

The diagnosis device 100 may calculate the abnormality degree of the fuel cell stack 10 by using the reference signal waveform (S170). The abnormality degree of the fuel cell stack 10 may be calculated through Equation 1.

The diagnosis device 100 may determine the abnormal state of the fuel cell stack 10 based on the abnormality degree (THDA) of the fuel cell stack 10, which is calculated in operation 170. If the abnormality degree (THDA) of the fuel cell stack 10 exceeds a set ratio (e.g., A %) (S180), the diagnosis device 100 determines the fuel cell stack 10 to be in the abnormal state (S200) and outputs the determination result (S210).

Meanwhile, even if the abnormality degree (THDA) of the fuel cell stack 10 does not exceed the set ratio (e.g., A %) in operation S180, if the abnormality degree is increased by at least the set ratio (e.g., B %, B<A) from the normal value (S190), the diagnosis device 100 determines the fuel cell stack 10 to be in the abnormal state (S200) and the determination result may be output (S210).

If the abnormality degree (THDA) of the fuel cell stack 10 is not increased by at least the set ratio (e.g., B %, B<A) from the normal value in operation S190, the diagnosis device 100 determines the fuel cell stack 10 to be in the normal state (S205) and may output the result.

In addition, the diagnosis device 100 according to the present disclosure operating as described above may be implemented in the form of an independent hardware device. In addition, the diagnosis device 100 may be provided in the form of at least one processor and driven in the incorporation form into another hardware device such as a micro-processor or a general computer system.

Figure 9:
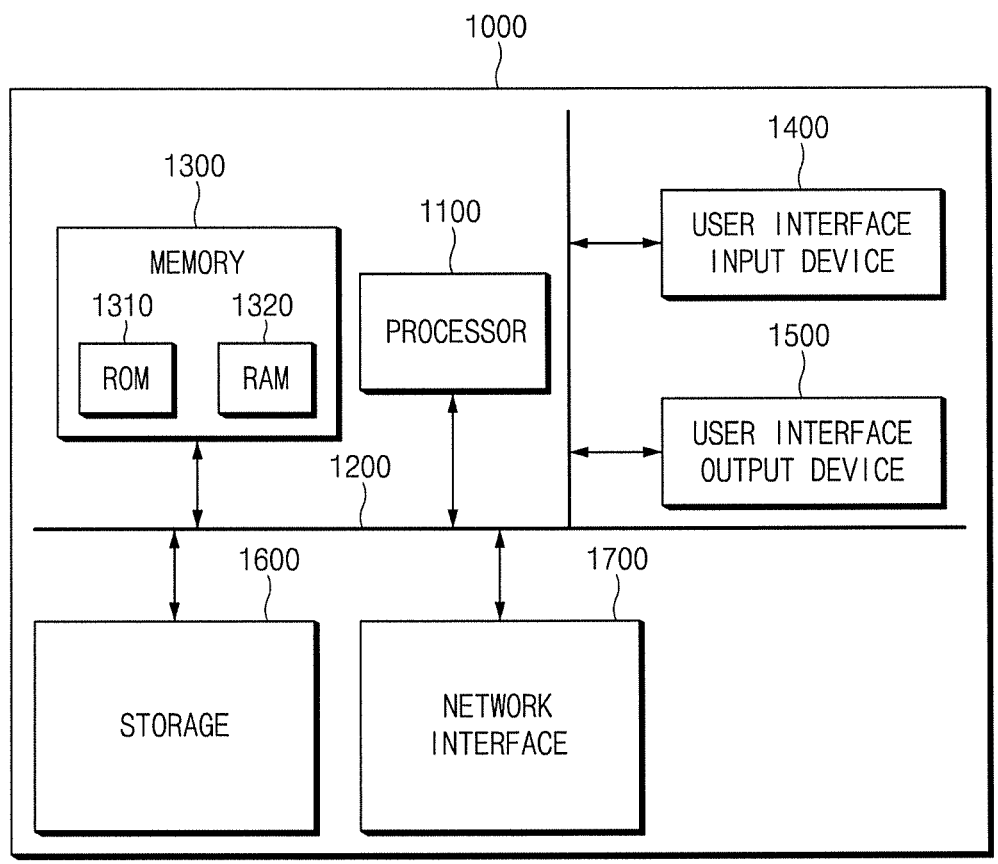
FIG. 9 is a block diagram illustrating a computing system to execute the method according to an embodiment of the present disclosure.

FIG. 9 is a block diagram illustrating a computing system to execute the method according to an embodiment of the present disclosure.

Referring to FIG. 9, a computing system 1000 may include at least one processor 1100, a memory 1300, a user interface input device 1400, a user interface output device 1500, a storage 1600, and a network interface 1700, which are connected with each other via a bus 1200.

The processor 1100 may be a central processing unit (CPU) or a semiconductor device for processing instructions stored in the memory 1300 and/or the storage 1600. The memory 1300 and the storage 1600 may include various types of volatile or non-volatile storage media. For example, the memory 1300 may include a read only memory (ROM) and a random access memory (RAM).

Thus, the operations of the methods or algorithms described in connection with the embodiments disclosed in the present disclosure may be directly implemented with a hardware module, a software module, or combinations thereof, executed by the processor 1100. The software module may reside on a storage medium (i.e., the memory 1300 and/or the storage 1600), such as a RAM, a flash memory, a ROM, an erasable and programmable ROM (EPROM), an electrically EPROM (EEPROM), a register, a hard disc, a removable disc, or a compact disc-ROM (CD-ROM). The exemplary storage medium may be coupled to the processor 1100. The processor 1100 may read out information from the storage medium and may write information in the storage medium. Alternatively, the storage medium may be integrated with the processor 1100. The processor and storage medium may reside in an application specific integrated circuit (ASIC). The ASIC may reside in a user terminal. Alternatively, the processor and THE storage medium may reside as separate components of the user terminal.

According to the present disclosure, the abnormal state of the fuel cell stack may be detected by using an output voltage of a reference signal waveform formed based on a stack voltage and a stack current of the fuel cell stack even if an additional alternating current (AC) signal is not applied to the fuel cell stack. Even if a unit of detecting the fuel cell stack is increased, the abnormal state of the fuel cell stack may be detected with higher accuracy, thereby enhancing diagnosis performance of the abnormal state of the fuel cell stack.

Hereinabove, although the present disclosure has been described with reference to exemplary embodiments and the accompanying drawings, the present disclosure is not limited thereto, but may be variously modified and altered by those skilled in the art to which the present disclosure pertains without departing from the spirit and scope of the present disclosure claimed in the following claims.

Therefore, embodiments of the present disclosure are not intended to limit the technical spirit of the present disclosure, but provided only for the illustrative purpose. The scope of protection of the present disclosure should be construed by the attached claims, and all equivalents thereof should be construed as being included within the scope of the present disclosure.

What is claimed is:

1. An apparatus for diagnosing a fuel cell, the apparatus comprising:
    a measuring device configured to measure a stack voltage and a stack current from a fuel cell stack; and
    at least one processor configured to:
        extract a plurality of reference current points and a plurality of reference voltage points corresponding to the reference current points by analyzing the measured stack voltage and the measured stack current;
        calculate an abnormality degree of the fuel cell stack based on a reference signal waveform formed by using voltage differences between the reference voltage points; and
        determine an abnormal state of the fuel cell stack based on the calculated abnormality degree of the fuel cell stack,
    wherein the at least one processor extracts at least three reference current points by analyzing a histogram of the stack current.

2. The apparatus of claim 1, wherein the at least one processor:
    extracts two current points, which make a current value difference of at least a reference value therebetween, among current points having a frequency of occurrence equal to or greater than a reference number, according to a histogram analysis result of the stack current; and
    extracts, as a reference current point, one or more current points having an intermediate current value between values of the extracted two current points.

3. The apparatus of claim 2, wherein the at least one processor calculates at least three reference voltage points corresponding to the at least three reference current points, which are extracted by analyzing the stack voltage and the stack current.

4. The apparatus of claim 3, wherein the reference signal waveform is a sinusoidal waveform having amplitudes which are formed by using voltage differences among the at least three reference voltage points.

5. The apparatus of claim 4, wherein the at least one processor calculates the abnormality degree of the fuel cell stack based on a ratio of a sum of harmonic amplitudes included in an output signal based on the reference signal waveform to an amplitude of an input signal.

6. The apparatus of claim 5, wherein the at least one processor determines the fuel cell stack to be in an abnormal state if the abnormality degree of the fuel cell stack exceeds a set ratio.

7. The apparatus of claim 6, wherein the at least one processor determines the fuel cell stack to be in an abnormal state if the abnormality degree of the fuel cell stack is increased by at least a set ratio from an abnormality degree of the fuel cell stack in a normal state.

8. The apparatus of claim 7, wherein the at least one processor is further configured to:
    filter the stack voltage and the stack current, which are measured, based on a reference value.

9. A method for diagnosing a fuel cell, the method comprising steps of:
    measuring a stack voltage and a stack current from a fuel cell stack;
    extracting, by at least one processor, a plurality of reference current points and a plurality of reference voltage points corresponding to the reference current points by analyzing the measured stack voltage and the measured stack current;
    forming, by the at least one processor, a reference signal waveform by using voltage differences among the reference voltage points;
    calculating, by the at least one processor, an abnormality degree of the fuel cell stack based on the reference signal waveform; and
    determining, by the at least one processor, an abnormal state of the fuel cell stack based on the abnormality degree of the fuel cell stack,
    wherein the step of extracting a plurality of reference current points and a plurality of reference voltage points includes extracting at least three reference current points by analyzing a histogram of the stack current.

10. The method of claim 9, wherein the step of extracting a plurality of reference current points and a plurality of reference voltage points includes:
    extracting two current points, which make a current value difference of at least a reference value therebetween, among current points having a frequency of occurrence equal to or greater than a reference number, according to a histogram analysis result of the stack current; and
    extracting, as reference current points, one or more current points having an intermediate current value between values of the extracted two current points.

11. The method of claim 10, wherein the step of extracting a plurality of reference current points and a plurality of reference voltage points includes:
    calculating at least three reference voltage points corresponding to the at least three reference current points, which are extracted by analyzing the stack voltage and the stack current.

12. The method of claim 11, wherein the reference signal waveform is a sinusoidal waveform having amplitudes which are formed by using voltage differences among the at least three reference voltage points.

13. The method of claim 12, wherein the step of calculating an abnormality degree of the fuel cell stack includes:
    calculating the abnormality degree of the fuel cell stack based on a ratio of a sum of harmonic amplitudes included in an output signal based on the reference signal waveform to an amplitude of an input signal.

14. The method of claim 13, wherein the step of determining an abnormal state of the fuel cell stack includes:
    determining the fuel cell stack to be in an abnormal state if the abnormality degree of the fuel cell stack is equal to or more than a set ratio.

15. The method of claim 14, wherein the step of determining an abnormal state of the fuel cell stack includes:
    determining the fuel cell stack to be in an abnormal state if the abnormality degree of the fuel cell stack is increased by at least a set ratio from an abnormality degree of the fuel cell stack in a normal state.

16. The method of claim 15, further comprising:
    filtering, by the at least one processor, the stack voltage and the stack current, which are measured in the measuring of the stack voltage and the stack current, based on a reference value.

17. A vehicle system comprising:
    a fuel cell stack;
    a diagnosis device implemented by at least one processor and configured to:
        extract a plurality of reference current points and a plurality of reference voltage points corresponding to the reference current points by analyzing a stack voltage and a stack current measured from the fuel cell stack;

calculate an abnormality degree of the fuel cell stack based on a reference signal waveform formed by using voltage differences between the reference voltage points; and determine an abnormal state of the fuel cell stack based on the abnormality degree of the fuel cell stack; and an input/output interface communicatively connected through the at least one processor and configured to output the abnormal state of the fuel cell stack, wherein the diagnosis device extracts at least three reference current points by analyzing a histogram of the stack current.

18. The vehicle system of claim 17, wherein the diagnosis device calculates the abnormality degree of the fuel cell stack based on a ratio of a sum of harmonic amplitudes included in an output signal based on the reference signal waveform to an amplitude of an input signal.

* * * * *